(12) United States Patent
Yamada

(10) Patent No.: US 8,581,746 B2
(45) Date of Patent: Nov. 12, 2013

(54) DRIVE ASSIST DEVICE AND METHOD

(71) Applicant: Toyota Jidosha Kabushiki Kaisha, Toyota (JP)

(72) Inventor: Yuki Yamada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/717,178

(22) Filed: Dec. 17, 2012

(65) Prior Publication Data

US 2013/0127640 A1 May 23, 2013

Related U.S. Application Data

(62) Division of application No. 13/058,083, filed as application No. PCT/JP2008/068288 on Oct. 8, 2008, now Pat. No. 8,405,523.

(51) Int. Cl.
*G08G 1/096* (2006.01)
(52) U.S. Cl.
USPC ........... 340/929; 340/917; 340/918; 340/923; 701/117; 701/119
(58) Field of Classification Search
USPC .................. 340/901–932.1; 701/117–119
See application file for complete search history.

(56) References Cited

U.S. PATENT DOCUMENTS

| | | | |
|---|---|---|---|
| 7,825,825 B2 | 11/2010 | Park | |
| 2005/0134478 A1 | 6/2005 | Mese et al. | |
| 2005/0237224 A1 | 10/2005 | Gotfried | |
| 2006/0009188 A1 | 1/2006 | Kubota et al. | |
| 2008/0253615 A1 | 10/2008 | Kubota et al. | |

FOREIGN PATENT DOCUMENTS

| | | |
|---|---|---|
| EP | 1 615 190 A2 | 1/2006 |
| EP | 1 615 190 A3 | 1/2006 |
| JP | 2004-171459 | 6/2004 |
| JP | 2006 48624 | 2/2006 |
| JP | 2006 155319 | 6/2006 |
| JP | 2007 232573 | 9/2007 |
| JP | 2008 33617 | 2/2008 |
| JP | 2008 197724 | 8/2008 |

OTHER PUBLICATIONS

U.S. Notice Allowance mailed Nov. 27, 2012 in U.S. Appl. No. 13/058,083.

(Continued)

*Primary Examiner* — George Bugg
*Assistant Examiner* — Sharmin Akhter
(74) *Attorney, Agent, or Firm* — Oblon, Spivak, McClelland, Maier & Neustadt, L.L.P.

(57) ABSTRACT

A drive assist device and method capable of preventing the confusion of a driver at a traffic signal with an arrow lamp are provided. An ECU has a section for determining whether or not it is possible to pass a signal, which determines whether or not a vehicle can pass a signal, and a signal waiting time notification control section, which determines a signal waiting time of the vehicle and displays it on a display unit when the section for determining whether or not it is possible to pass a signal determines that the vehicle cannot pass a signal. The section for determining whether or not it is possible to pass a signal determines not only a lighting time of only a red signal but also a lighting time of a red signal and an arrow lamp and a lighting time of a yellow signal subsequent thereto are determined as a no-pass time.

7 Claims, 10 Drawing Sheets

(56) References Cited

OTHER PUBLICATIONS

International Search Report issued Nov. 25, 2008 in PCT/JP08/68288 filed Oct. 8, 2008.

English translation of International Preliminary Report on Patentability issued May 19, 2011, in PCT/JP2008/068288.

Extended Search Report issued Mar. 2, 2012 in European Patent Application No. 08877263.7-1232/2346012.

DRIVE ASSIST DEVICE AND METHOD

CROSS-REFERENCE TO RELATED APPLICATIONS

This application is a divisional of U.S. application Ser. No. 13/058,083, filed Feb. 8, 2011, the entire content of which is incorporated herein by reference. U.S. application Ser. No. 13/058,083 is the National Stage application of PCT International Application No. PCT/JP08/68288, filed Oct. 8, 2008.

TECHNICAL FIELD

The present invention relates to a drive assist device and method of giving drive assistance using the information regarding a traffic signal.

BACKGROUND ART

As an example of a conventional drive assist device, a device which provides guidance regarding the attribution information (for example, the type or characteristic) of a traffic signal on the basis of signal data when a traffic signal is present at a route point, which is included in a predetermined guidance route, in an in-vehicle navigation is known, as disclosed in Patent Literature 1.

Patent Literature 1: Japanese Unexamined Patent Application Publication No. 2007-232573

SUMMARY OF INVENTION

Technical Problem

In the case that the traffic signal is a signal with an arrow lamp, if, for example, drive assistance is given by acquiring the lighting state information of an arrow lamp by the infrastructure information, a driver may be panic or feel uncomfortable or may be confused instead.

It is an object of the present invention to provide a drive assist device and method capable of preventing the confusion of a driver at a traffic signal with an arrow lamp.

Solution to Problem

A drive assist device of the present invention includes: signal information acquisition means for acquiring signal information regarding a traffic signal; means for determining whether or not passing is possible which determines whether or not it is possible to pass the traffic signal on the basis of the signal information; and assist content determination means for determining the content of drive assistance on the basis of a determination result of the means for determining whether or not passing is possible, and is characterized in that the means for determining whether or not passing is possible sets, as a no-pass time, a time from lighting of a first red signal after lighting of a green signal ends to the end of lighting of a red signal immediately before lighting of the next green signal when it is determined that the traffic signal has an arrow lamp on the basis of the signal information and the assist content determination means provides notification of a waiting time until the no-pass time ends from stopping of a vehicle when the vehicle stops within a range of the no-pass time and provides notification of a waiting time until the no-pass time ends from the start of the no-pass time when the vehicle stops out of the range of the no-pass time.

As an example of the signal cycle of a signal with an arrow lamp, there is "green signal lighting->yellow signal lighting->temporary lighting of red signal->lighting of red signal and arrow lamp->yellow signal lighting->red signal lighting->green signal lighting". In this case, if passing a signal is regarded as possible and drive assistance is not given accordingly when the yellow signal is lit, execution and non-execution of the drive assistance are switched dizzyingly. As a result, a driver becomes easily confused. Moreover, if passing a signal is regarded as possible and drive assistance is not given accordingly when an arrow lamp is lit, it is the same as the red signal for a vehicle which does not move in a direction indicated by the arrow lamp that is lit. As a result, a driver of the vehicle becomes easily confused. Therefore, in the present invention, a lighting time of an arrow lamp and a lighting time of a yellow signal subsequent to lighting of the arrow lamp are determined as a no-pass time, so that it is possible to prevent execution and non-execution of drive assistance from being dizzyingly switched and appropriate drive assistance can be given to a vehicle which does not move in a direction indicated by the arrow lamp that is lit. Therefore, since the panic or uncomfortable feeling of a driver is reduced, the confusion of the driver can be prevented. In addition, a no-pass time that suits the driving sense of the actual driver can be set for a signal with an arrow lamp. In addition, a driver of a vehicle can know an exact signal waiting time when the vehicle stops at the intersection where a signal with an arrow lamp is installed.

A drive assist device of the present invention includes: signal information acquisition means for acquiring signal information regarding a traffic signal; means for determining whether or not passing is possible which determines whether or not it is possible to pass the traffic signal on the basis of the signal information; assist content determination means for determining the content of drive assistance on the basis of a determination result of the means for determining whether or not passing is possible; and statistical information acquisition means for acquiring statistical information regarding traveling directions of vehicles at an intersection where the traffic signal is installed, and is characterized in that the means for determining whether or not passing is possible determines a lighting time of the arrow lamp and a lighting time of a yellow signal subsequent to lighting of the arrow lamp as a no-pass time when it is determined that the traffic signal has an arrow lamp on the basis of the signal information and the assist content determination means does not give drive assistance when a probability of traveling in a direction indicated by the arrow lamp that is lit is determined to be equal to or higher than a predetermined value on the basis of the statistical information regarding the traveling directions of vehicles even if the means for determining whether or not passing is possible determines that it is not possible to pass the traffic signal.

For example, when a road with a large width or a road with a large number of lanes is present in a direction passing through the intersection where a signal with an arrow lamp is installed, it is thought that, statistically, many drivers drive in the direction even if it is not the straight-ahead direction. Therefore, the confusion of many drivers can be sufficiently prevented by acquiring the statistical information regarding traveling directions of vehicles at the intersection where a traffic signal is installed and not giving drive assistance when a probability of traveling in a direction indicated by the arrow lamp that is lit is determined to be equal to or higher than the predetermined value on the basis of the statistical information.

Preferably, even if the means for determining whether or not passing is possible determines that it is not possible to pass the traffic signal, the assist content determination means does not give drive assistance when an arrow lamp indicating a straight-ahead direction is lit.

At the intersection where a signal with an arrow lamp is installed, it is regarded that there are many vehicles traveling in the straight-ahead direction. Therefore, when an arrow lamp indicating the straight-ahead direction is lit, drive assistance is not given so that the confusion of many drivers can be sufficiently prevented.

In addition, preferably, traveling direction detection means for detecting a traveling direction of a vehicle is further provided. Even if the means for determining whether or not passing is possible determines that it is not possible to pass the traffic signal, the assist content determination means does not give drive assistance when a direction indicated by an arrow lamp that is lit is the same as the traveling direction of the vehicle detected by the traveling direction detection means.

For example, when a signal with an arrow lamp has an arrow lamp indicating a direction equal to the course guide direction of a navigation of a vehicle, a possibility that the vehicle will travel in the direction indicated by the arrow lamp is high. Therefore, the confusion of a driver of a vehicle can be sufficiently prevented by detecting the traveling direction of the vehicle and not giving drive assistance when the direction indicated by an arrow lamp, which is lit, is the same as the traveling direction of the vehicle.

At this time, it is preferable that the assist content determination means does not give a warning to a driver as the drive assistance.

In this case, since an unnecessary warning is not given to a driver of a vehicle trying to travel in a direction indicated by an arrow lamp that is lit, the driver does not feel irritated.

A drive assist method of the present invention includes: a signal information acquisition step of acquiring signal information regarding a traffic signal; a step of determining whether or not passing is possible which determines whether or not it is possible to pass the traffic signal on the basis of the signal information; and an assist content determination step of determining the content of drive assistance on the basis of a determination result of the step of determining whether or not passing is possible, and is characterized in that a time from the lighting of a first red signal after the lighting of a green signal ends to the end of lighting of a red signal immediately before lighting of the next green signal is set as a no-pass time when it is determined that the traffic signal has an arrow lamp on the basis of the signal information in the step of determining whether or not passing is possible and a waiting time until the no-pass time ends from stopping of a vehicle is notified when the vehicle stops within a range of the no-pass time and a waiting time until the no-pass time ends from the start of the no-pass time is notified when the vehicle stops out of the range of the no-pass time in the assist content determination step.

In the drive assist method of the present invention, a lighting time of an arrow lamp and a lighting time of a yellow signal subsequent to lighting of the arrow lamp are determined as a no-pass time. Accordingly, since the panic or uncomfortable feeling of a driver is reduced as described above, the confusion of the driver can be prevented.

Advantageous Effects of Invention

According to the present invention, since the panic or uncomfortable feeling of a driver at the intersection where a signal with an arrow lamp is installed is reduced, the confusion of the driver can be prevented.

DESCRIPTION OF EMBODIMENTS

Hereinafter, preferred embodiments of a drive assist device and method related to the present invention will be described in detail with reference to the drawings.

Figure 1:
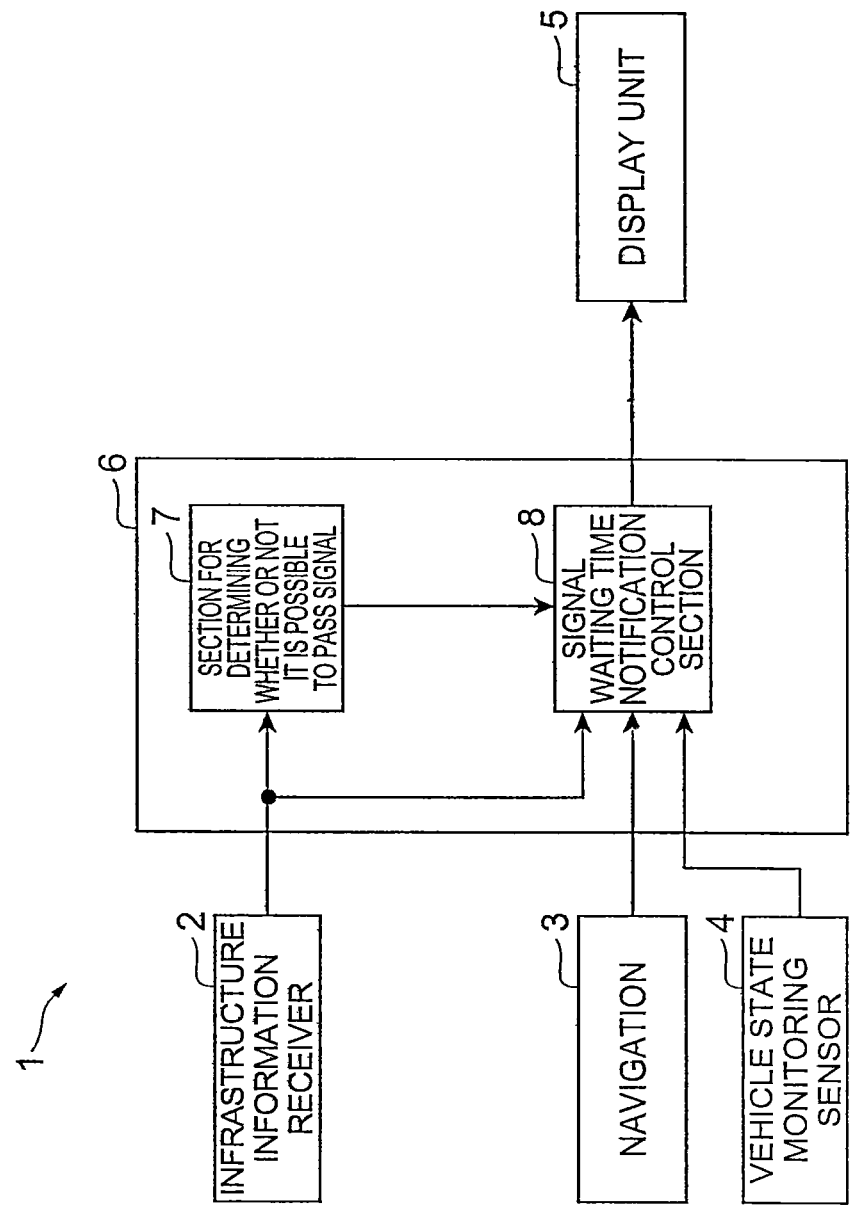
FIG. 1 is a block diagram showing the configuration of an embodiment of a drive assist device related to the present invention.

FIG. 1 is a block diagram showing the configuration of an embodiment of a drive assist device related to the present invention. In this drawing, a drive assist device 1 of the present embodiment is applied to a system, which notifies a driver of a waiting time (signal waiting time) at a traffic signal using the signal information regarding a traffic signal, and is mounted in a vehicle.

The drive assist device 1 includes an infrastructure information receiver 2, a navigation 3, a vehicle state monitoring sensor 4, a display unit 5, and an ECU (Electronic Control Unit) 6.

The infrastructure information receiver 2 is a device which receives the infrastructure information transmitted from an infrastructure apparatus (for example, a light beacon) installed on the road. Examples of the infrastructure information include the signal information, such as a signal form or a signal cycle in a traffic signal, and the road information, such as the lane configuration of a road, the width of a road, and the curvature of a road.

The navigation 3 is a device which detects a current position of a vehicle using a GPS (global positioning system) or which acquires various kinds of information including the information regarding a road (the same as described above), on which the vehicle travels, from the road map information stored in an internal memory.

The vehicle state monitoring sensor 4 is a sensor which monitors a state of a vehicle. Specifically, examples of the vehicle state monitoring sensor 4 include a vehicle speed sensor which detects a speed of a vehicle, a brake sensor which detects an ON state of a brake, an indicator sensor which detects an operation state of an indicator switch, and a steering angle sensor which detects a steering angle of steering.

The display unit 5 displays various kinds of information including the signal waiting time information of the vehicle at a traffic signal. The display unit 5 may be provided in a meter display panel or the like, or may be integrated with the navigation 3.

The ECU 6 is configured to include a CPU, memories such as a ROM and a RAM, and input and output circuits. The ECU 6 has a section for determining whether or not it is possible to pass a signal 7 and a signal waiting time notification control section 8. The section for determining whether or not it is possible to pass a signal 7 determines whether or not the vehicle can pass a traffic signal. When the section for determining whether or not it is possible to pass a signal 7 determines that the vehicle cannot pass a traffic signal, the signal waiting time notification control section 8 determines a signal waiting time of the vehicle and displays it on the display unit 5.

Figure 2:
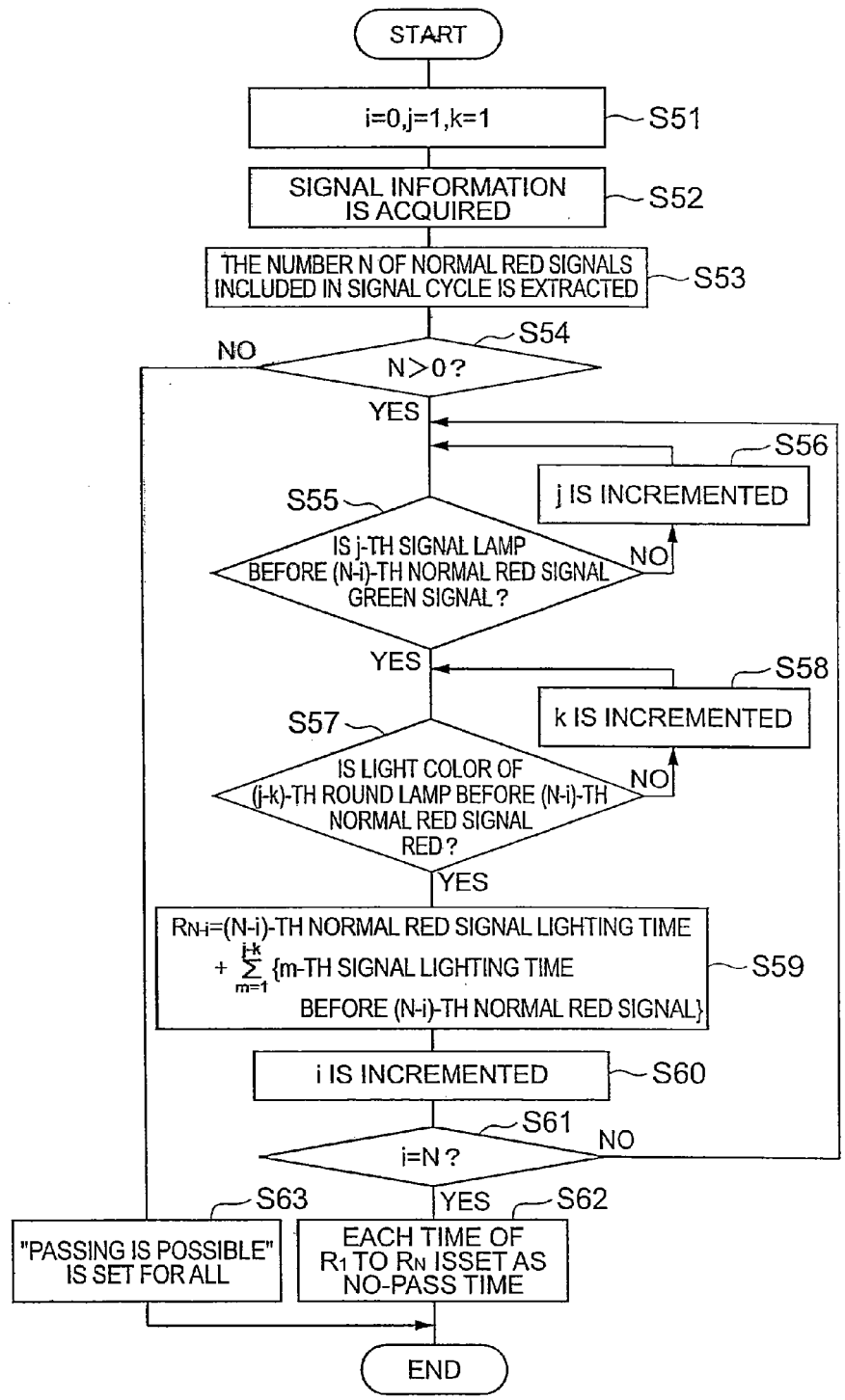
FIG. 2 is a flow chart showing the procedure of processing of determining whether or not it is possible to pass a signal which is executed by a section for determining whether or not it is possible to pass a signal shown in FIG. 1.

FIG. 2 is a flow chart showing the procedure of processing of determining whether or not it is possible to pass a signal which is executed by the section for determining whether or not it is possible to pass a signal 7. In this drawing, first, a variable i is initialized to 0, a variable j is initialized to 1, and a variable k is initialized to 1 (step S51).

Then, the signal information received by the infrastructure information receiver 2 is acquired (step S52). A form (regarding whether or not there is an arrow lamp and the number of arrow lamps) of a traffic signal shown in FIG. 3, a signal cycle (order of lighting colors and display time (seconds)) shown in FIG. 4, and the like are included in the signal information.

Figure 3:
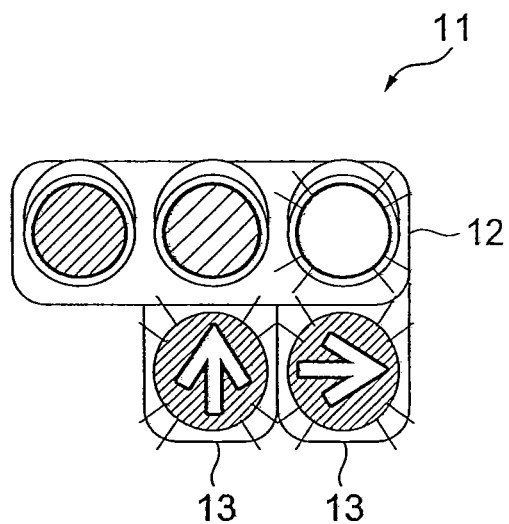
FIG. 3 is a front view showing an example of a signal with an arrow lamp.
Figure 4:
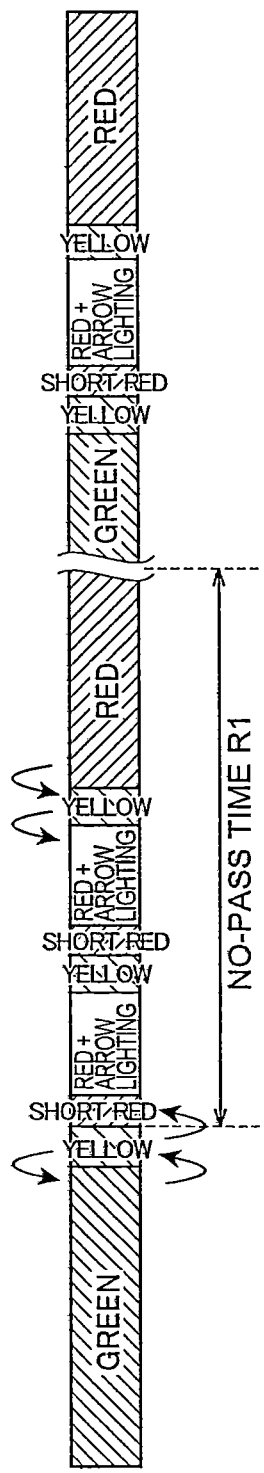
FIG. 4 is a view showing an example of a signal cycle of a signal with an arrow lamp.

A traffic signal 11 shown in FIG. 3 is a signal with an arrow lamp which has a signal body (round lamp) 12 and an arrow lamp 13 (here, two arrow lamps). The signal cycle shown in FIG. 4 has a configuration of "green signal lighting->yellow signal lighting->temporary (short-time) lighting of red signal->lighting of red signal and arrow lamp->yellow signal lighting->temporary (short-time) lighting of red signal->lighting of red signal and arrow lamp->yellow signal lighting->red signal lighting->green signal lighting . . . ". In addition, red signal lighting refers to when a lighting time of a red signal is equal to or larger than a threshold value (for example, 4 seconds), and temporary (short-time) lighting of a red signal refers to when a lighting time of a red signal is smaller than the threshold value.

Then, the number N of red signals (normal red signals which are not red signals temporarily lighted; hereinafter, referred to as normal red signals) included in the signal cycle acquired in step S52 is extracted (step S53). In the signal cycle shown in FIG. 4, the number N of normal red signals is 2.

Then, it is determined whether or not there is a normal red signal (N>0) (step S54). When there is a normal red signal, it is determined whether or not a j-th signal lamp before an (N−i)-th normal red signal is a green signal (step S55). When the j-th signal lamp before the (N−i)-th normal red signal is not a green signal, the variable j is incremented. That is, 1 is added to the variable j (step S56), and the process returns to step S55. In short, the signal cycle is traced sequentially from the back until a signal lamp before the normal red signal becomes a green signal. In the signal cycle shown in FIG. 4, an eighth signal lamp before the first normal red signal is a green signal.

When it is determined that the j-th signal lamp before the (N−i)-th normal red signal is a green signal in step S55, it is determined whether or not a light color of a (j−k)-th round lamp before the (N−i)-th normal red signal is red (step S57). When the light color of the (j−k)-th round lamp before the (N−i)-th normal red signal is not red, the variable k is incremented (step S58), and the process returns to step S57. In the signal cycle shown in FIG. 4, a sixth red signal, which is temporarily lighted, before the first normal red signal (second behind a green signal) is the target.

When it is determined that the light color of the (j−k)-th round lamp before the (N−i)-th normal red signal is red in step S57, a time $R_{N-1}$ is calculated using the following expression (step S59). This time $R_{N-1}$ is a time until the (N−i)-th normal red signal ends from a point in time of a first red signal after a green signal (refer to FIG. 4).

$$R_{N-i} = (N-i)\text{-}th \text{ normal red signal lighting time} + \sum_{m=1}^{j-k} \{m\text{-}th \text{ signal lighting time}$$

[Expression 1]

before $(N-i)$-$th$ normal red signal}

Then, the variable i is incremented (step S60), and then it is determined whether or not the variable i is equal to the number N of normal red signals (step S61). When the variable i is not equal to the number N of normal red signals, the process returns to step S55.

When the variable i is equal to the number N of normal red signals, the time $R_1$ to $R_N$ calculated in step S59 is set as a no-pass time (step S62). The time $R_1$ is a no-pass time based on the first normal red signal, and the time $R_2$ is a no-pass time based on the second normal red signal.

On the other hand, when it is determined that there is no normal red signal in step S54, it is determined that passing is possible (step S63).

Figure 5:
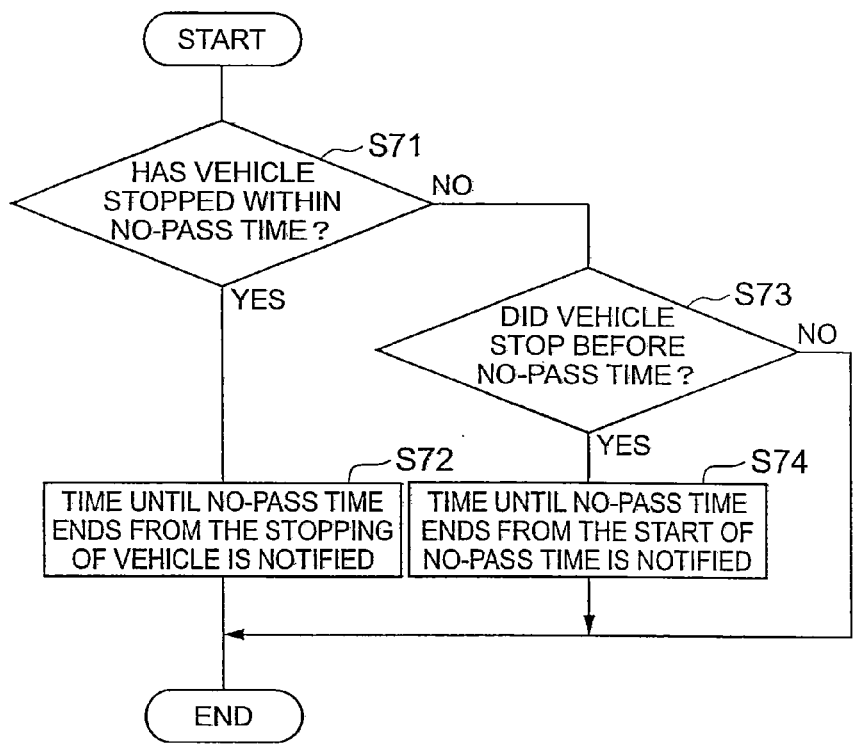
FIG. 5 is a flow chart showing the procedure of signal waiting time notification control processing executed by a signal waiting time notification control section shown in FIG. 1.

FIG. 5 is a flow chart showing the procedure of signal waiting time notification control processing executed by the signal waiting time notification control section 8.

In this drawing, first, on the basis of the detection value of the vehicle state monitoring sensor 4 (specifically, a vehicle speed sensor or a brake sensor) or the information of the navigation 3, it is determined whether or not the vehicle has stopped within the no-pass time, which was set by the section for determining whether or not it is possible to pass a signal 7, at a traffic signal corresponding to the signal information acquired previously (step S71).

Figure 6:
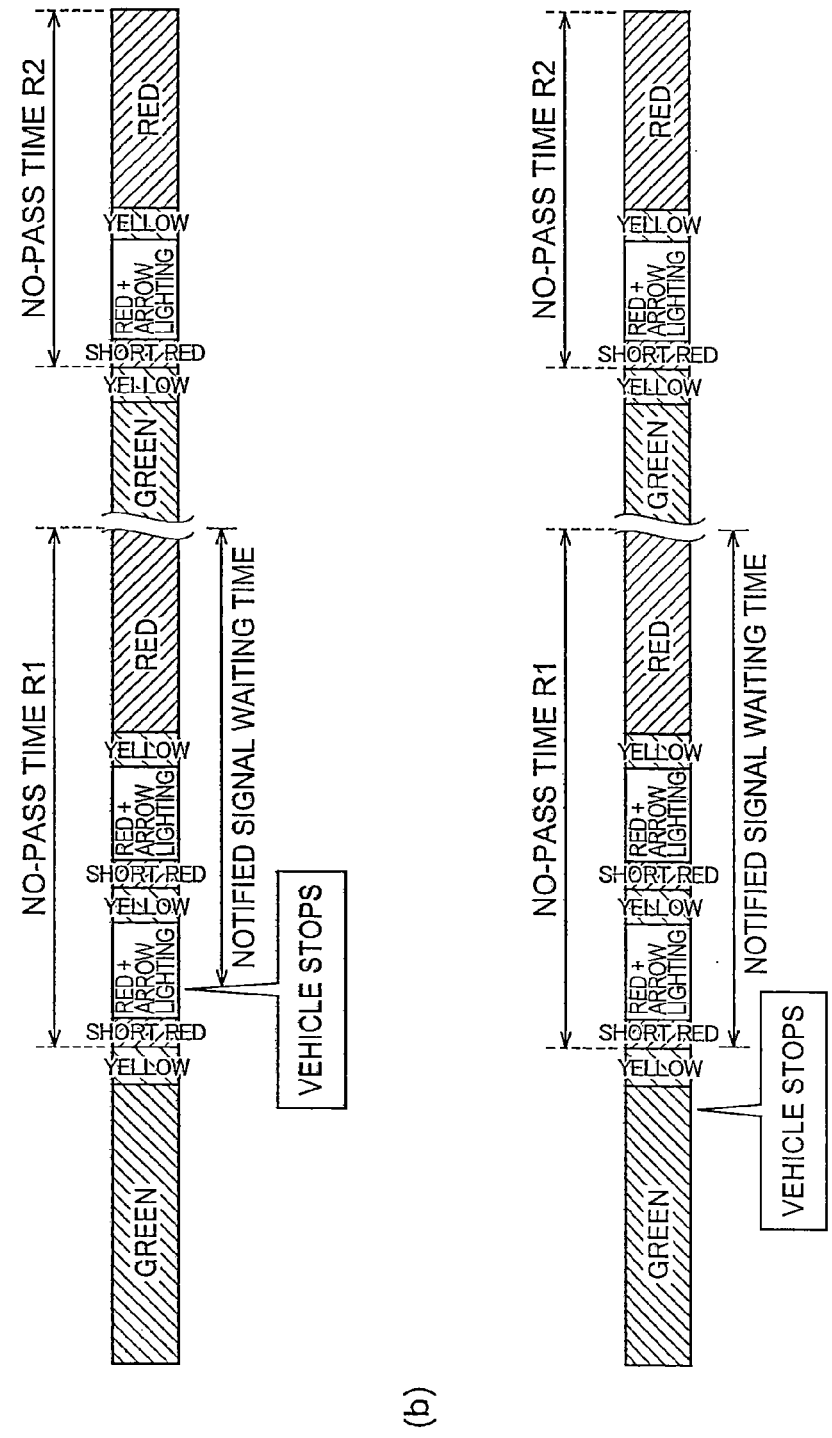
FIG. 6 is a view showing the relationship between a no-pass time, which is acquired by the section for determining whether or not it is possible to pass a signal shown in FIG. 1, and a signal waiting time, which is acquired by the signal waiting time notification control section shown in FIG. 1.

When the vehicle has stopped within the no-pass time, a remaining time until the no-pass time ends (green signal lights) from the stopping of the vehicle is displayed on the display unit 5 in a sequential manner as shown in FIG. 6(a) (step S72). As a result, an accurate signal waiting time after the vehicle stops can be notified to the driver of the vehicle.

On the other hand, when the vehicle has not stopped within the no-pass time, it is determined whether or not the vehicle stopped before the no-pass time set by the section for determining whether or not it is possible to pass a signal 7 starts in the same manner as described above (step S73).

When the vehicle stopped before the no-pass time starts, a remaining time until the no-pass time ends (green signal lights) from the start of the no-pass time is displayed on the display unit 5 in a sequential manner as shown in FIG. 6(b) (step S74). Accordingly, for example, even in the case where it is not possible to pass a traffic signal because a vehicle in front has stopped even though the traffic signal is a green signal, an exact signal waiting time from the point in time when the traffic signal has changed to a red signal can be notified to the driver of the vehicle.

In the above, step S52 in the infrastructure information receiver 2 and the section for determining whether or not it is possible to pass a signal 7 of the ECU 6 forms signal information acquisition means for acquiring the signal information regarding a traffic signal. Steps S51 and S53 to S63 in the section for determining whether or not it is possible to pass a signal 7 form means for determining whether or not passing is possible which determines whether or not it is possible to pass a traffic signal on the basis of the signal information. The navigation 3, the vehicle state monitoring sensor 4, and the signal waiting time notification control section 8 of the ECU 6 form assist content determination means for determining the content of drive assistance on the basis of a determination result of the means for determining whether or not passing is possible.

Meanwhile, in such a system which notifies a driver of a signal waiting time, in the case where a signal waiting time (remaining time of a red signal) is notified only when a red signal is lit (lighting of a red signal and an arrow lamp is also included), the signal waiting time is not notified at the time of lighting of a yellow signal subsequent to the lighting state of the red signal and the arrow lamp. Accordingly, since the notified time changes dizzyingly, the driver becomes easily confused. Moreover, when the red signal and the arrow lamp are lighting, a remaining time of the state is notified. Accordingly, for a driver trying to drive in a direction indicated by the arrow lamp which is lit, the time in which passing is possible is notified as it is. This may cause panic or the like of the driver.

Moreover, in the case where a signal waiting time is not notified when a red signal and an arrow lamp are lighting, a driver who does not drive in a direction indicated by the arrow lamp which is lit does not know why the signal waiting time is not notified despite being equivalent to the red signal. As a result, the driver feels uncomfortable and becomes easily confused.

On the other hand, in the present embodiment, not only the lighting time of only a red signal but also the lighting time of a red signal and an arrow lamp and the lighting time of a yellow signal subsequent thereto are determined as a no-pass time, and a remaining time until a green signal lights is notified as a signal waiting time on the basis of the determination result. Accordingly, the signal waiting time notified does not change dizzyingly. In addition, the panic or the like of a driver trying to drive in a direction indicated by an arrow lamp which is lit is suppressed. Moreover, since a signal waiting time is notified to a driver who does not drive in the direction indicated by an arrow lamp which is lit, the driver rarely feels uncomfortable. As described above, the confusion of a driver when a vehicle passes a signal with an arrow lamp can be prevented.

Figure 7:
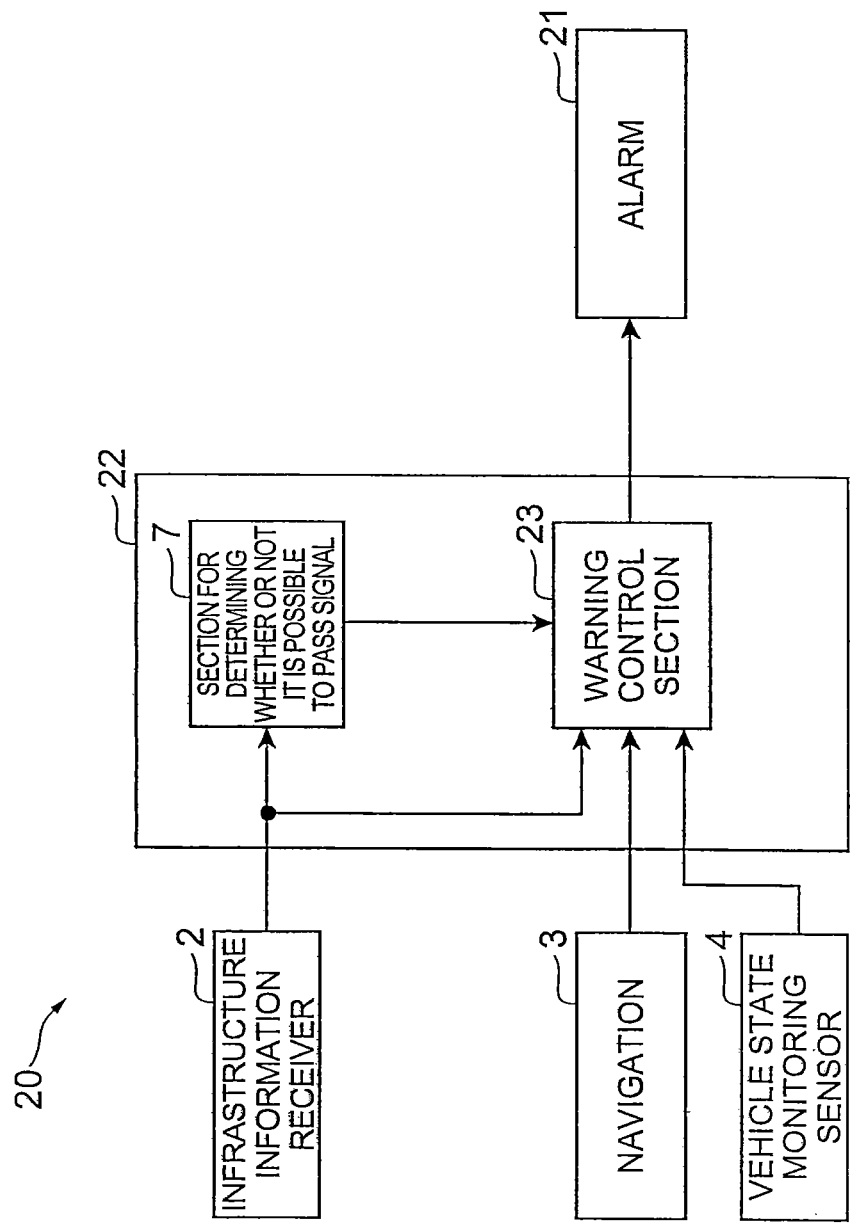
FIG. 7 is a block diagram showing the configuration of another embodiment of the drive assist device related to the present invention.

FIG. 7 is a block diagram showing the configuration of another embodiment of a drive assist device related to the present invention. In the drawing, the same or equivalent components as in the embodiment described above are denoted by the same reference numerals, and the explanation will be omitted.

In this drawing, a drive assist device 20 of the present embodiment is applied to a system, which warns a driver not to pass a traffic signal at the time of a red signal using the information regarding the traffic signal, and is mounted in a vehicle.

The drive assist device 20 includes an alarm 21 and an ECU 22 instead of the display unit 5 and the ECU 6 in the embodiment described above. The ECU 22 has the above-described section for determining whether or not it is possible to pass a signal 7 and a warning control section 23 which controls the alarm 21 using a determination result of the section for determining whether or not it is possible to pass a signal 7.

Figure 8:
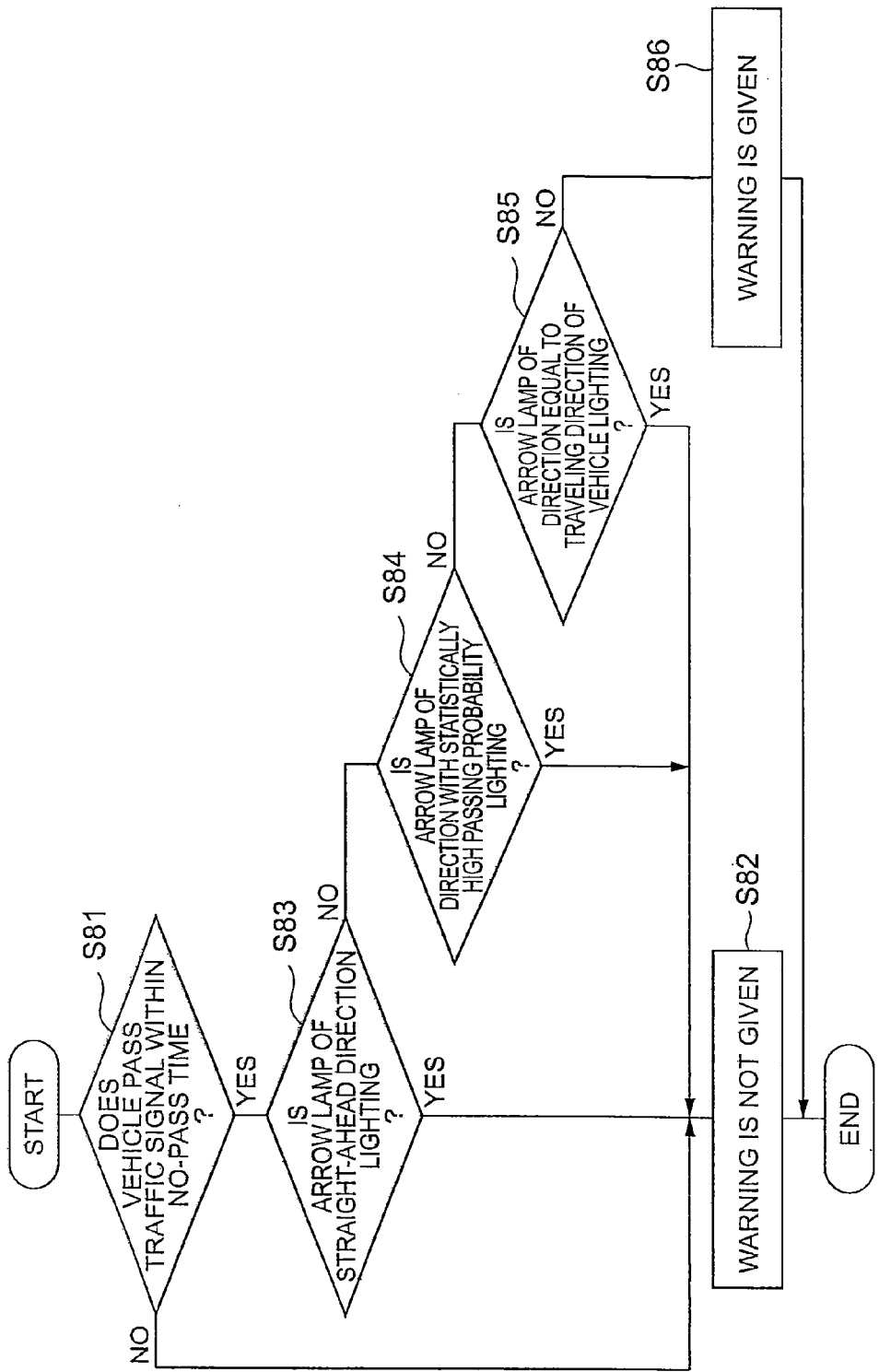
FIG. 8 is a flow chart showing the procedure of warning control processing executed by a warning control section shown in FIG. 7.

FIG. 8 is a flow chart showing the procedure of warning control processing executed by the warning control section 23. In this drawing, first, it is determined whether or not a vehicle may pass a traffic signal within a time, in which it was determined that passing was not possible by the section for determining whether or not it is possible to pass a signal 7, on the basis of the signal information received by the infrastructure information receiver 2 (step S81). When it is determined that the vehicle cannot pass the traffic signal within the time for which it is determined that passing is not possible by the section for determining whether or not it is possible to pass a signal 7, an alarm sound is not generated from the alarm 21 (step S82).

On the other hand, when it is determined that the vehicle may pass the traffic signal within the time for which it is determined that passing is not possible by the section for determining whether or not it is possible to pass a signal 7, it is determined whether or not an arrow lamp indicating a straight-ahead direction in a signal with an arrow lamp is lit on the basis of the signal information received by the infrastructure information receiver 2 (step S83).

When it is determined that an arrow lamp indicating the straight-ahead direction is lit, the lighting time of the arrow lamp indicating the straight-ahead direction is regarded as a time in which passing is possible, and the alarm 21 is controlled not to generate an alarm sound (step S82). At this time, only for the case where a signal with an arrow lamp has a plurality of arrow lamps, an alarm sound may not be generated when an arrow lamp indicating the straight-ahead direction is lit. Moreover, if the number of lanes on the road and the road width after passing a traffic signal are taken into consideration, only for the case where the number of lanes in the straight-ahead direction is the same as that in the other directions and there is no considerable difference in the road width, an alarm sound may not be generated when an arrow lamp indicating the straight-ahead direction is lit.

It is thought that many vehicles travel in the straight-ahead direction at the intersection in many cases. For this reason, by disallowing the generation of an alarm sound when an arrow lamp indicating the straight-ahead direction is lit, it is not necessary to give unnecessary warning to drivers of many vehicles trying to travel in the straight-ahead direction.

When it is determined that an arrow lamp indicating the straight-ahead direction does not light in step S83, it is determined whether or not an arrow lamp indicating a direction with a statistically higher probability of passing a signal with an arrow lamp than a predetermined value set in advance is lit on the basis of the infrastructure information including the signal information received by the infrastructure information receiver 2 (step S84).

Figure 9:
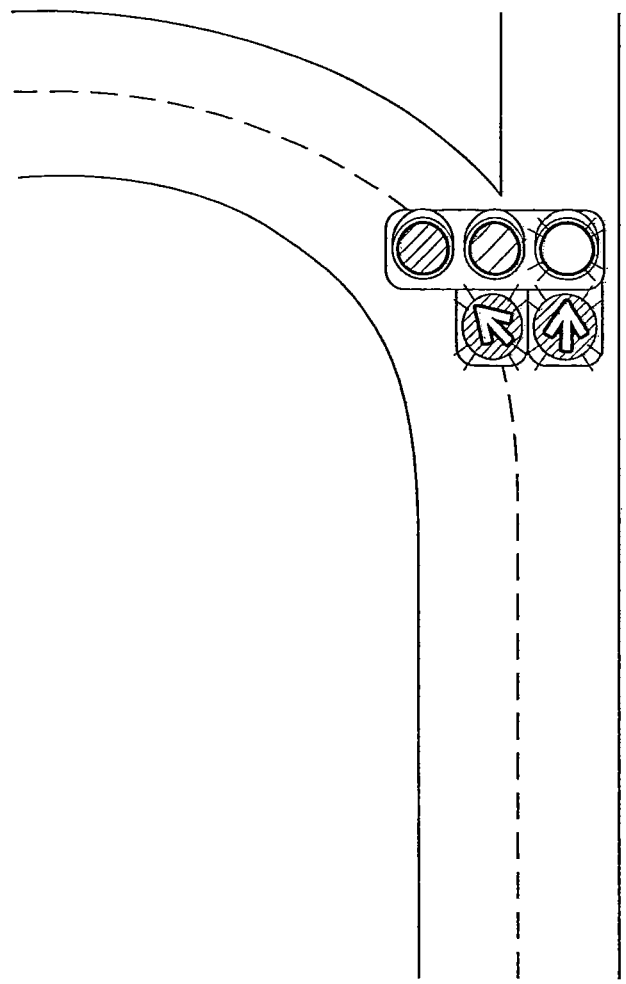
FIG. 9 is a view showing an example of the intersection, at which the road width and the number of lanes on the road change with a direction, together with a signal with an arrow lamp.
Figure 10:
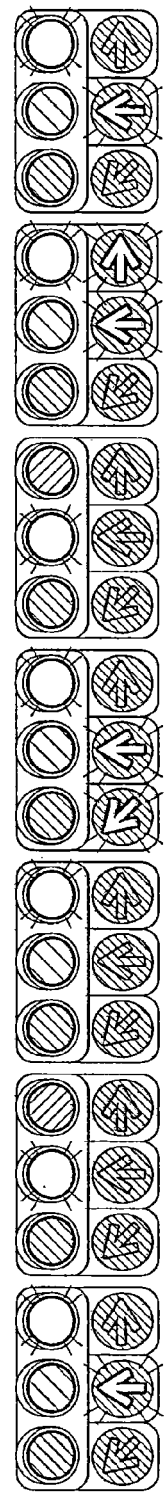
FIG. 10 is a view showing an example of an arrow lamp having a direction, in which light is always turned on, when an arrow lamp lights in a signal with an arrow lamp.

As examples of the direction with a higher probability of passing a signal with an arrow lamp than the predetermined value, there is the direction of the road with the largest road width after passing the traffic signal or the direction of the road having the largest number of lanes after passing the traffic signal. For example, at the intersection shown in FIG. 9, a left oblique direction corresponds to this. In addition, as the direction with a higher probability of passing a signal with an arrow lamp than the predetermined value, there is also a direction indicated by an arrow lamp which always lights when at least one of a plurality of arrow lamps lights. For example, in a signal with an arrow lamp shown in FIG. 10, an arrow lamp indicating the straight-ahead direction corresponds to this. In addition, a direction indicated by an arrow lamp with the longest lighting time in a signal with an arrow lamp which has no green signal lighting time, a preferred direction, and the like may be mentioned as the direction with a higher probability of passing a signal with an arrow lamp than the predetermined value. In addition, the road width, the number of lanes, and the like may also be acquired from the information of the navigation 3.

When it is determined that an arrow lamp indicating a direction with a higher probability of passing a signal with an arrow lamp than the predetermined value is lit, the lighting time of the arrow lamp indicating the direction is regarded as a time in which passing is possible, and the alarm 21 is controlled not to generate an alarm sound (step S82).

Thus, by disallowing the generation of an alarm sound at the time of lighting of an arrow lamp which has a statistically high probability of passing a signal with an arrow lamp and which indicates a direction in which many drivers tends to drive, it is not necessary to give unnecessary warning to many drivers trying to drive in this direction.

When it is determined that an arrow lamp indicating a direction with a higher probability of passing a signal with an arrow lamp than the predetermined value does not light, it is determined whether or not an arrow lamp indicating a direction, which is the same direction as the traveling direction of the vehicle, in the signal with an arrow lamp is lit on the basis of the signal information received by the infrastructure information receiver 2 and the information of the navigation 3 or the detection value of the vehicle state monitoring sensor 4 (step S85).

Examples of the traveling direction of a vehicle include a course guide direction of the navigation 3, a direction corresponding to a large number of times of passing in the past travel history in the navigation 3, a direction of a route returning home, and an exclusive lane direction when a vehicle travels on the road with an exclusive lane. In addition, when the vehicle state monitoring sensor 4 (specifically, an indicator sensor or a steering angle sensor) detects that the driver took a left or right turning action, the direction is a traveling direction of the vehicle. At this time, when a left or right turning action is not seen until a certain distance or time, the straight-ahead direction may be regarded as a traveling direction of the vehicle.

When it is determined that an arrow lamp indicating a direction equal to the traveling direction of the vehicle is lit, the lighting time of the arrow lamp indicating the direction is regarded as a time in which passing is possible, and the alarm 21 is controlled not to generate an alarm sound (step S82).

Thus, by disallowing the generation of an alarm sound when an arrow lamp indicating a direction equal to the clear traveling direction of the vehicle is lit, it is not necessary to give unnecessary warning to the driver of the vehicle trying to travel in the direction.

When it is determined that an arrow lamp indicating a direction equal to the traveling direction of the vehicle does not light in step S85, the alarm 21 is controlled to generate an alarm sound (step S86). That is, in the case where a vehicle may pass a traffic signal within a time for which it is determined that passing is not possible by the section for determining whether or not it is possible to pass a signal 7, an alarm sound is generated when none of an arrow lamp indicating a straight-ahead direction, an arrow lamp indicating a direction with a statistically higher probability of passing a signal with an arrow lamp than a predetermined value, and an arrow lamp indicating a direction equal to the traveling direction of a vehicle are lighting.

In the above, the warning control section 23 of the ECU 22 forms assist content determination means for determining the content of drive assistance on the basis of a determination result of means for determining whether or not passing is possible. The infrastructure information receiver 2 and the navigation 3 form statistical information acquisition means for acquiring the statistical information regarding traveling directions of vehicles at the intersection where a traffic signal is installed. The navigation 3 and the vehicle state monitoring sensor 4 form traveling direction detection means for detecting the traveling direction of a vehicle.

As described above, in the present embodiment, not only the lighting time of only a red signal but also the lighting time of a red signal and an arrow lamp and the lighting time of a yellow signal subsequent thereto are determined as a no-pass time and a warning is given to a driver of a vehicle, which may pass an intersection at the time of a red signal, on the basis of the determination result. As a result, an uncomfortable feeling of the driver can be reduced.

At this time, even if the section for determining whether or not it is possible to pass a signal 7 determines that passing is not possible, a warning is not given to the driver when an arrow lamp indicating a straight-ahead direction is lit, when an arrow lamp indicating a direction with a statistically higher probability of passing a signal than a predetermined value is lit, and when an arrow lamp indicating a direction equal to the traveling direction of the vehicle is lit. As a result, since an uncomfortable feeling of the driver is further reduced, drive assistance that suits the driving sense of the driver can be offered.

As described above, the confusion of a driver when a vehicle passes a signal with an arrow lamp can be prevented.

In addition, warning means for a driver is not particularly limited to the above-described alarm sound and may be a warning display or the like.

While the preferred embodiments of the drive assist device related to the present invention have been described, the present invention is not limited to the above-described embodiments. For example, although the drive assist device is mounted in a vehicle in the above-described embodiments, the drive assist device may be provided in an infrastructure apparatus at the roadside, for example. In this case, a signal waiting time is notified or a warning is given using road-to-vehicle communication, for example.

In addition, it is needless to say that the drive assist device and method of the present invention can also be applied to a drive assist device other than the system which provides notification of a signal waiting time or the system which gives a warning not to pass a traffic signal at the time of a red signal.

Industrial Applicability

The present invention provides a drive assist device and method capable of preventing the confusion of a driver at a traffic signal with an arrow lamp.

The invention claimed is:
1. A drive assist device comprising:
   an infrastructure information receiver that receives infrastructure information including at least signal information regarding a traffic signal;
   a determination unit that determines whether or not it is possible to pass the traffic signal on the basis of the signal information; and an assist content notification unit that notifies the content of drive assistance on the basis of a determination result of the determination unit, wherein if the traffic signal has an arrow lamp, the determination unit determines that it is not possible to pass the traffic signal during a lighting time of the arrow lamp and lighting time of a yellow signal subsequent to lighting of the arrow lamp; and if the arrow lamp indicating a straight-ahead direction is lit, the assist content notification unit does not notify the content of drive assistance.

2. The drive assist device according to claim 1, further comprising:

a statistical information acquisition unit that acquires statistical information regarding traveling directions of vehicles at an intersection where the traffic signal is installed, wherein even if the determination unit determines that it is not possible to pass the traffic signal, the assist content notification unit does not notify the content of drive assistance when a probability of traveling in a direction indicated by the arrow lamp that is lit is determined to be equal to or higher than a predetermined value on the basis of the statistical information regarding the traveling directions of vehicles.

3. The drive assist device according to claim 1, further comprising:

a traveling direction detection unit that detects a traveling direction of a vehicle, wherein even if the determination unit determines that it is not possible to pass the traffic signal, the assist content notification unit does not notify the content of drive assistance when a direction indicated by an arrow lamp that is lit is the same as the traveling direction of the vehicle detected by the traveling direction detection unit.

4. The drive assist device according to claim 1, wherein the assist content notification unit does not give a warning to a driver as the drive assistance.

5. The drive assist device according to claim 1, wherein the determination unit sets, as a no-pass time, a time from lighting of a first red signal after lighting of a green signal ends to the end of lighting of a red signal immediately before lighting of the next green signal.

6. The drive assist device according to claim 5, wherein the assist content notification unit provides notification of a waiting time until the no-pass time ends from stopping of a vehicle when the vehicle stops within a range of the no-pass time and provides notification of a waiting time until the no-pass time ends from the start of the no-pass time when the vehicle stops out of the range of the no-pass time.

7. A drive assist method comprising:

an infrastructure information receiving step of receiving infrastructure information including at least signal information regarding a traffic signal;

a determination step of determining whether or not it is possible to pass the traffic signal on the basis of the signal information; and an assist content notification step of notifying the content of drive assistance on the basis of a determination result of the determination step, wherein if the traffic signal has an arrow lamp, it is determined in the determination step that it is not possible to pass the traffic signal during a lighting time of the arrow lamp and lighting time of a yellow signal subsequent to lighting of the arrow lamp; and if the arrow lamp indicating a straight-ahead direction is lit, the content of drive assistance is not notified in the assist content notification step.

* * * * *